United States Patent Office 2,849,468
Patented Aug. 26, 1958

2,849,468

AMINO ACID DERIVATIVES

Earl V. Cardinal, Deerfield, Ill., assignor to International Minerals & Chemical Corporation, a corporation of New York No Drawing. Application February 1, 1954
Serial No. 407,571

8 Claims. (Cl. 260—429.9)

The instant invention relates to the preparation of certain zinc salts of glutamic acid. More particularly, it relates to processes for the recovery of glutamic acid from solutions containing it by precipitation of certain zinc glutamate salts.

At the present time glutamic acid in the form of its sodium salt is very much in demand for the purpose of flavor enhancement of certain foods and food products. Conventional processes for the production of glutamic acid involve hydrolysis with acid or alkali of materials containing glutamic acid precursor compounds, such as vegetable proteins, wheat gluten, corn gluten, animal proteins, casein, and the like, and molasses residues, such as Steffen's filtrate, schlempe, vinasse, and the like. Generally, glutamic acid is recovered from hydrolysates containing it by precipitation and removal of impurities from the crude glutamic acid-containing hydrolysate followed by isoelectric crystallization of the glutamic acid. However, when isoelectric crystallization is employed, a constant and a substantial amount of glutamic acid is lost in the end liquors from which the glutamic acid has been crystallized. Isoelectric crystallization is also not suitable for the recovery of glutamic acid from very crude or very dilute solutions, such as from the end liquors.

In the past, attempts have been made to recover glutamic acid as an insoluble salt from crude or dilute aqueous solutions, such as from hydrolysates of protein or of aqueous molasses residues from which sugar has been removed, or from end liquors from the conventional type processing of glutamic acid hydrolysates. Of the known insoluble glutamic acid salts, none have been found suitable for removal of glutamic acid from such solutions, because precipitation of glutamic acid from the solutions in the form of the salt was either not complete or the salt was highly contaminated by impurities present in the crude solutions which precipitated under the conditions required for precipitation of the glutamate salt.

It is an object of the instant invention to provide processes for the production of certain zinc salts of glutamic acid.

It is a further object of the instant invention to provide processes for the preparation and separation of zinc glutamate salts from solutions containing glutamic acid.

It is a further object of the instant invention to provide processes for the preparation of zinc magnesium glutamate.

It is a further object of the instant invention to provide processes for the separation of the glutamic acid present in aqueous solutions containing it.

It is a further object of the instant invention to provide new zinc glutamate salts.

These and other objects of the instant invention will become more apparent as hereinafter described.

It has been discovered that certain zinc salts of glutamic acid are prepared by mixing a solution containing glutamic acid with zinc hydroxide.

The instant invention involves the reaction of glutamic acid in an aqueous solution with zinc hydroxide at a pH between about 5.5 and about 11.0. The zinc hydroxide employed is preferably freshly precipitated. By the term "freshly precipitated zinc hydroxide" as used in the description and claims is meant, either in situ precipitated zinc hydroxide, or wet zinc hydroxide which is separately precipitated prior to reaction with the glutamic acid-containing solution. The reaction is carried out at any convenient temperature, for example between about atmospheric temperature and about reflux temperature. The insoluble zinc glutamate salt is separated from the resulting solution in any convenient conventional manner.

In one embodiment of the instant invention, the zinc hydroxide is prepared in situ. A zinc salt, such as zinc chloride, zinc sulfate, zinc phosphate, zinc acetate, or the like, is admixed with an aqueous solution containing between about 0.1% and about 10% of glutamic acid, preferably between about 0.1% and about 1% glutamic acid. The resulting solution is then adjusted to a pH between about 5.5 and about 11.0, preferably between about 6.3 and about 10.5, with an alkaline hydroxide, such as an alkali metal hydroxide or an alkaline earth metal hydroxide. The resulting precipitate of zinc glutamate is separated from the solution, for example by filtration.

In another embodiment of the instant invention, an aqueous solution containing glutamic acid is admixed with freshly precipitated zinc hydroxide. After standing at least about 15 minutes, the insoluble product is separated from the solution, for example by filtration. Although the solution may be allowed to stand longer periods, for example between about 15 minutes and about 24 hours, precipitation is substantially complete after about 15 minutes. The zinc hydroxide employed in this reaction is separately prepared by any conventional method, for example by admixing zinc chloride or zinc sulfate with an alkali, such as sodium hydroxide or ammonia and separating the resulting zinc hydroxide precipitate, for example by filtration. The zinc hydroxide may be washed and is then admixed with the glutamic acid-containing solution.

In another embodiment of the instant invention, the zinc magnesium glutamate salt is precipitated from an aqueous solution. For example, an aqueous solution containing glutamic acid is mixed with magnesium hydroxide in order to form magnesium glutamate which generally is soluble in the solution. Freshly precipitated zinc hydroxide is added to the magnesium glutamate-containing solution or the zinc hydroxide is precipitated in situ in the magnesium glutamate-containing solution by adding a zinc salt, such as zinc chloride to the solution and adjusting the pH of the resulting solution to between about 5.5 and about 11.0, in the manner previously described. The dizinc magnesium diglutamate is separated from the resulting solution, for example by filtration.

The formation of these salts is carried out at any temperature, for example between about atmospheric temperature and about reflux temperature of the solution. The salts are formed at about the same rate at atmospheric temperatures as at reflux temperatures, and the temperature at which the reaction is carried out is a matter of choice.

These salts are prepared from any glutamic acid-containing solution. Crude solutions containing glutamic acid, as well as solutions containing refined glutamic acid, may be employed. Glutamic acid is recovered from crude solutions by precipitation and separation of the instant salts. For example, the glutamic acid is precipitated in the form of the zinc or the zinc magnesium salt from crude solutions containing glutamic acid, such as a hydrolysate or from end liquors containing glutamic acid.

By the term "end liquors" is meant a hydrolysate, such as a protein hydrolysate, a Steffen's filtrate hydrolysate, a vinasse hydrolysate, or other glutamic acid-containing solution from which part of the glutamic acid has been separated by crystallization. The end liquor usually contains about 2.5% of glutamic acid and up to about 60% solids. During conventional processing of hydrolysates usually involving the removal of impurities and other amino acids prior to the isoelectric crystallization of glutamic acid, a portion of the glutamic acid content of the hydrolysate is converted to pyrrolidone carboxylic acid, the lactam of glutamic acid. Frequently, if a substantial amount of the glutamic acid has been converted to pyrrolidone carboxylic acid prior to the crystallization of glutamic acid, it is desirable to subject the glutamic acid end liquor to hydrolysis, for example with mineral acid, to convert the pyrrolidone carboxylic acid to glutamic acid prior to precipitation of the glutamic acid as the zinc glutamate salt. By hydrolyzing any pyrrolidone carboxylic acid present in the hydrolysate end liquor to glutamic acid, the recovery of glutamic acid from the hydrolysate is increased.

In another embodiment of the instant invention, the glutamic acid present in crude solutions containing it, such as hydrolysates of proteinaceous material or of aqueous molasses residues, or a hydrolysate end liquor is selectively separated by precipitation as the zinc glutamate or zinc magnesium glutamate salt. For example, Steffen's filtrate which results from the removal of the sucrose from beet sugar molasses contains pyrrolidone carboxylic acid. In carrying out the Steffen's process, beet sugar molasses is diluted with water and is then treated with an alkaline earth metal oxide or hydroxide, such as calcium oxide. Calcium saccharates which are relatively insoluble are formed and are filtered from the solution and are returned to the sugar process. The filtrate containing between about 1% and about 5% total solids is termed Steffen's filtrate or waste water. The Steffen's filtrate hydrolysate, generally containing between about 4% and about 10% glutamic acid content, or the Steffen's filtrate hydrolysate end liquor containing between about 1.5% and about 2.5% glutamic acid concentration, is admixed with a zinc salt, preferably zinc chloride. In a preferred practice of the instant invention, the glutamic acid-containing liquor is diluted to a glutamic acid content between about 0.1% and about 2% prior to precipitation of the zinc glutamate salt. Generally, between about 300 grams and about 800 grams, preferably about 600 grams of zinc chloride per kilogram of Steffen's filtrate hydrolysate, or between about 200 grams and about 400 grams, preferably about 350 grams of zinc chloride per kilogram of Steffen's filtrate hydrolysate end liquor are employed. Sufficient alkali or alkaline earth metal hydroxide, such as sodium hydroxide or calcium hydroxide is added to the resulting mixture to produce a pH between about 6.3 and about 11.0, preferably between about 8.5 and about 9.5. The resulting mixture is allowed to stand for between about 1 hour and about 24 hours, and the precipitate containing zinc glutamate is separated, for example by filtration.

The pH employed for the precipitation of these glutamic salts is higher in the case of a glutamic acid solution containing a very small percentage of glutamic acid in relation to impurities, such as thin Steffen's filtrates and protein hydrolysates or end liquors from either, than for solutions containing refined glutamic acid. For example, in the case of crude solutions, the salts are preferably formed at pH's between about 6.3 and about 10.7. However, when refined glutamic acid is dissolved in water, the salts are preferably precipitated at a pH between about 5.5 and about 10.0.

Likewise, the amount of zinc used in preparing these salts from crude and dilute mixtures containing glutamic acid is preferably greater than the amount used for preparing the derivative from refined glutamic acid-containing solutions. For example, when the zinc glutamate is precipitated from Steffen's filtrate hydrolysate end liquors containing generally between about 1.5% and about 2.5% glutamic acid concentration, between about 8 moles and about 10 moles of zinc per mole of glutamic acid are employed. When the same salt is prepared from refined glutamic acid, between about 1 mole and about 2 moles of zinc are employed per mole of glutamic acid.

The zinc glutamate and the zinc magnesium glutamate are very insoluble in water. For this reason, glutamic acid can be selectively and substantially completely precipitated in the form of these salts from very dilute and crude solutions. If desired, glutamic acid is isolated from these salts by precipitation of zinc from the solution in the form of an insoluble salt, such as zinc sulfide or zinc carbonate, followed by isoelectric crystallization of glutamic acid from the solution.

The exact chemical formula for these zinc glutamate salts prepared in accordance with the instant process is not definitely known. It is suspected that the salts are the dihydroxy trizinc diglutamate and the dihydroxy magnesium dizinc diglutamate, however this is theoretical and not to be understood as a limitation of the instant invention.

The following examples are presented in order to afford a clearer understanding of the practice of the instant invention, but it is understood that they are illustrative only and there is no intention to limit the invention thereto.

EXAMPLE I

Zinc hydroxide was prepared by dissolving about 94.9 grams of zinc sulfate (0.33 mole) in about 450 milliliters of water and adjusting the pH of the resulting solution to about 6.7 with an aqueous 50% sodium hydroxide solution. The freshly precipitated zinc hydroxide was separated by filtration, washed free of sulfate ions, and was immediately admixed with an aqueous solution containing about 29.43 grams (0.2 mole) of glutamic acid dissolved in about 400 milliliters of hot water. The resulting mixture was allowed to stand for about 10 hours, and the product was separate by filtration. The yield of zinc glutamate salt was about 99% and weighed about 53.0 grams.

EXAMPLE II

About 29.43 grams of glutamic acid (0.2 mole) and about 6.06 grams of magnesium hydroxide (0.1 mole) were added to about 200 milliliters of water and were heated to about 60° C. The resulting magnesium glutamate-containing solution was cooled to about 25° C. Solid material was separated by filtration. About 100 milliliters of aqueous solution containing about 27.4 grams of zinc chloride (0.2 mole) was then added to the filtrate, and sufficient aqueous 4 normal sodium hydroxide was added to the resulting solution to produce a pH of about 6.7. The resulting product was separated by filtration and was dried. The zinc magnesium glutamate product weighed about 46.9 grams, and precipitation was about 98.8% complete.

EXAMPLE III

About 14.7 grams of glutamic acid were added to about 2 liters of water, and the resulting suspension was heated to dissolve the glutamic acid. About 20.4 grams of zinc chloride (0.15 mole) were added to the glutamic acid-containing solution, and sufficient sodium hydroxide was admixed with the resulting solution to produce a pH of about 7.3. The precipitated zinc salt was separated by filtration and was washed. About 97.0% of the glutamic acid was precipitated in the form of the zinc glutamate salt. An analysis of the product was approximately as follows:

5.1% nitrogen (theory 5.4%)
36.8% zinc (theory 37.8%)

The above procedure was repeated with the exception that the zinc salt was precipitated at various pH's. Table I below shows the variation of the percent of glutamic acid precipitated with variation of the pH.

Table I

PERCENT ORIGINAL GLUTAMIC ACID PRECIPITATED AT VARIOUS pH'S

| pH | Glutamic acid precipitated, percent |
|---|---|
| 5.7 | 98.7 |
| 6.8 | 99.3 |
| 7.6 | 99.0 |
| 8.2 | 93.0 |

EXAMPLE IV

About 1000 grams of concentrated Steffen's filtrate hydrolysate end liquor was subjected to hydrolysis by mixing with about 380 grams of about 32% aqueous hydrochloric acid and refluxing for about 3 hours. About 350 grams of zinc chloride in solution was added to the resulting hydrolysate, the pH of which was then adjusted to about 5.8 with sodium hydroxide. Solids comprising mainly humin were separated from the solution by filtration. The resulting solution was then adjusted to a pH of about 8.5 with an aqueous 50% solution of sodium hydroxide. Zinc glutamate was separated from the resulting solution by filtration and was dried. The crude precipitate contained about 94% of original glutamic acid as a zinc salt. The crude precipitate was suspended in water and sufficient sodium sulfide was added to obtain a pH of about 12.2. The resulting precipitate was separated by filtration. Glutamic acid was recovered from the filtrate by concentrating and adjusting the pH to about 3.2 with hydrochloric acid. The crystallized product contained about 50% of the original glutamic acid present in the end liquor.

EXAMPLE V

About 1000 grams of concentrated Steffen's filtrate hydrolysate, produced by heating concentrated Steffen's filtrate with an aqueous solution of about 800 grams of about 37% hydrochloric acid at between about 105° C. and about 110° C., was mixed with about 600 grams of zinc chloride. The resulting solution was then adjusted to a pH of about 8.0 with an aqueous solution of about 50% sodium hydroxide. Zinc glutamate was separated from the resulting solution by filtration. The crude precipitate contained about 92% of the original glutamic acid in the form of a zinc glutamate salt.

Having thus fully described and illustrated the character of the instant invention, what is desired to be protected by Letters Patent is:

1. A process for the preparation of zinc magnesium glutamate which comprises mixing an aqueous magnesium glutamate-containing solution with freshly precipitated zinc hydroxide at a pH between about 5.5 and about 11.0, and separating the insoluble zinc magnesium glutamate salt therefrom.

2. A process for the preparation of zinc magnesium glutamate which comprises mixing an aqueous magnesium glutamate solution having a concentration between about 0.1% and about 10% and freshly precipitated zinc hydroxide at a pH between about 5.5 and about 11.0, and separating the insoluble zinc magnesium glutamate salt therefrom.

3. A process for the preparation of zinc magnesium glutamate which comprises mixing glutamic acid and magnesium hydroxide in an aqueous solution, adding zinc chloride and sufficient alkali hydroxide selected from the group consisting of alkaline earth metal hydroxides and alkali metal hydroxides to the resulting solution to produce a pH between about 5.5 and about 11.0, and separating the insoluble zinc magnesium glutamate salt therefrom.

4. A process for the preparation of zinc magnesium glutamate which comprises preparing an aqueous solution containing between about 1 mole and about 2 moles of a magnesium glutamate and between about 2 moles and about 5 moles of freshly precipitated zinc hydroxide at a pH between about 5.5 and about 11.0, and separating the insoluble zinc magnesium glutamate salt therefrom.

5. A process for the recovery of glutamic acid from a glutamic acid end liquor which comprises mixing said end liquor and freshly precipitated zinc hydroxide at a pH between about 6.3 and about 10.5, separating the insoluble zinc salt therefrom, preparing an aqueous suspension of said insoluble zinc salt, precipitating the zinc as an inorganic salt selected from the group consisting of zinc sulfide and zinc carbonate, separating the resulting insoluble zinc salt from the solution, and recovering glutamic acid from the resulting solution.

6. A process for the recovery of glutamic acid from a glutamic acid end liquor which comprises mixing said end liquor containing between about 0.1% and about 1% glutamic acid content and freshly precipitated zinc hydroxide at a pH between about 6.3 and about 10.5, separating the insoluble zinc salt therefrom, preparing an aqueous suspension of said insoluble zinc salt, precipitating the zinc as an inorganic salt selected from the group consisting of zinc sulfide and zinc carbonate, separating the resulting insoluble zinc salt from the solution, and recovering glutamic acid from the resulting solution.

7. A process for the recovery of glutamic acid from a glutamic acid end liquor which comprises preparing a mixture thereof having a pH between about 6.3 and about 10.5 with magnesium hydroxide and freshly precipitated zinc hydroxide, separating the insoluble zinc magnesium glutamate salt therefrom, preparing an aqueous suspension of said insoluble salt, precipitating the zinc as an inorganic salt selected from the group conisting of zinc sulfide and zinc carbonate, separating the resulting insoluble zinc salt from the solution, and recovering glutamic acid from the resulting solution.

8. Zinc magnesium glutamate, prepared in accordance with the process of claim 7.

References Cited in the file of this patent

UNITED STATES PATENTS 1,582,472   Ikeda _____ Apr. 27, 1926

OTHER REFERENCES

Kutscher: "Hoppe Seyler's Zeit. f. Physiologische Chemie" 38 (1903), pages 110, 119.
Abderhalden u. Kautzsch ibid. 68 (1910), 501.
Weiser: "Hydrous Oxides," 1926, pages 169 and 170.